United States Patent
Kleven et al.

Patent Number: 5,372,046
Date of Patent: Dec. 13, 1994

[54] VORTEX FLOWMETER ELECTRONICS

[75] Inventors: Lowell Kleven, Eden Prairie; Roger Frick, Hackensack, both of Minn.

[73] Assignee: Rosemount Inc., Eden Prairie, Minn.

[21] Appl. No.: 954,513

[22] Filed: Sep. 30, 1992

[51] Int. Cl.$^5$ ............................................. G01F 1/32
[52] U.S. Cl. ................................. 73/861.22; 327/311; 327/552
[58] Field of Search ..................... 73/861.22; 328/167, 328/162, 165; 307/520, 521, 543

[56] References Cited

U.S. PATENT DOCUMENTS

| | | | |
|---|---|---|---|
| 3,638,037 | 1/1972 | McMurkrie | 307/520 |
| 3,709,034 | 1/1973 | Herzl | 73/194 B |
| 3,864,972 | 2/1975 | Burgess et al. | 73/861.22 |
| 4,270,391 | 6/1981 | Herzl | 73/861.22 |
| 4,545,258 | 10/1985 | Coursolle | 73/861.22 |
| 4,815,324 | 3/1989 | Tada et al. | 73/861.22 |
| 4,866,435 | 9/1989 | Frick | 340/870.16 |
| 4,893,035 | 1/1990 | Reynolds et al. | 307/520 |

OTHER PUBLICATIONS

Yehuda Avirav et al., *IEEE Transactions on Instrumentation and Measurement*, vol. 39 No. 5. Oct. 1990, Implementation of Digital Signal Processing Techniques in the Design of Thermal Pulse Flowmeters.

*Primary Examiner*—Richard E. Chilcot, Jr.
*Assistant Examiner*—Harshad Patel
*Attorney, Agent, or Firm*—Westman, Champlin & Kelly

[57] ABSTRACT

A vortex flow transmitter has a filtering circuit receiving a noise contaminated input signal representative of the flow and which has a fundamental frequency varying responsively to flow. The filter filters the input signal using one of a family of HP filter characteristics to produce a filtered signal having a frequency representative of the physical parameter. Each member of the family of HP filters has varying corner frequencies, each filter having a unique switchup and a unique switchdown value assigned to it. Adaptive response element select a current HP filter for use in the filter. Adaptive circuitry uses one selection method when the flow is increasing and another selection method when the flow decreases. Finally, output circuitry converts the signal from the filter into a transmitter output, typically a 4–20 mA current or a frequency output representative of the flow.

32 Claims, 6 Drawing Sheets

VORTEX FLOWMETER ELECTRONICS

BACKGROUND OF THE INVENTION

The present invention relates to flowmeters, such as vortex shedding meters or swirlmeters which are responsive to a fluid flow. In particular, it relates to electronics for such meters which reduce noise in a flow responsive signal.

Flowmeters sense the flow of liquid and gases in conduits and produce a noise contaminated flow responsive signal. Under certain circumstances, the presence of an obstacle or shedder in a flow conduit causes periodic vortices. A vortex flowmeter produces shedding vortices from a bluff body. The frequency of these vortices is directly proportional to the flow velocity in the meter. The shedding vortices produce an alternating differential pressure across the bluff body at the shedding frequency. This differential pressure is converted to an electrical signal by piezoelectric crystals or other differential pressure devices. The magnitude of the differential pressure or electric signal is proportional to $\rho V^2$, where $\rho$ is the fluid density and $V$ is the fluid velocity. When the ratio of pipe diameter to the size of the shedding bar is held constant, the signal is proportional to $\rho D^2 F^2$, where $D$ is the inside diameter of the meter and $F$ is the shedding frequency. The flowmeter produces pulses having a frequency proportional to the flow rate. The swirlmeter produces a similar flow responsive signal by measuring the vortex precession frequency produced by swirling the flow, then passing the flow through a downstream contraction and expansion.

The vortex flowmeter signal comprises a fundamental signal which has a fundamental frequency representative of the flow and an associated noise signal at various frequencies caused by fluid turbulence and other unrepeatable factors such as pipe vibrations, common mode pressure variation and noise from acoustic sources. Pipe vibrations caused by pumps, motors and unsupported sections of pipe are usually in the 0 to 100 Hz range and common mode pressure noise in the 10 to 1000 Hz range, while acoustic noise is generally above 100 Hz. Fluid turbulence results in noise on both sides of the fundamental frequency. Because fluid turbulence noise generally increases in amplitude as the flow velocity increases, it is particularly troublesome when low frequency turbulent noise below the fundamental frequency is disproportionally amplified by signal processing electronics.

Flowmeters, like vortex shedding meters and swirlmeters are designed for a variety of applications encompassing wide ranges of flow rates, pipe diameters and fluid densities. Consequently, such meters operate over a relatively large dynamic range. When fluid density is constant, the flow velocity range is typically 25 to 1. Even with the flow range at 25 to 1, signal amplitude will change by a ratio of 625 to 1, because the signal is proportional to the square of the velocity. When variable fluid densities are taken into account, which range between 1 and 800 in fluids such as atmospheric air to liquids, a frequency change of 100 to 1 is possible for a specific meter size and will result in a maximum signal amplitude range from 10,000 to 1. Unfortunately, the signal-to-noise ratio changes markedly over the ranges. Furthermore amplitude and frequency modulation of the flow signal introduces low and high frequency noise that causes problems for some signal conditioning systems. Consequently, a single filtering system is needed which improves variations in signal to noise ratio over a large dynamic range encompassing wide ranges of flow, density and diameter yet differentiates flow signal from unwanted noise.

In order to provide electronics to improve the signal to noise ratio over a large dynamic range, some electronics control the amplitude of the vortex signal through a feedback method. Other systems utilize a phase lock loop that averages phase errors. Both amplitude control and phase lock loop systems have a response time set to the lowest frequency or data rate. As a result, high frequency response suffers.

A single set of electronics having an improved high frequency response which proportionally amplify low frequencies is desired. There is also a need for electronics which have a sufficiently fast response time to prevent loss of pulses during flow transients.

SUMMARY OF THE INVENTION

The present invention is a transmitter sensing a physical parameter such as flow. Filter means in the transmitter receive a noise contaminated input signal representative of the physical parameter which has a fundamental frequency varying responsively to the physical parameter. Filter means filter the input signal with a current high pass (HP) filter characteristic to produce a filtered signal having a frequency representative of the physical parameter. The frequency characteristic of the HP filter means is selected from a family of preselectable HP filters having varying corner frequencies. Each HP filter in the family has a unique switchup and a unique switchdown value assigned to it. The electronics include timer means which provide a period timer value representative of the time between period boundaries of the filtered signal and also provide a present timer value representative of the elapsed time since a last period boundary of the filtered signal. The electronics also include adaptive response means which select a current HP filter for use in the filter means. The adaptive means use one selection method when the flow is increasing and another selection method when the flow decreases. For increasing flow, a HP filter corner higher in frequency than the current filter corner is selected when the period timer value is less than a switchup value corresponding to the filter having such next higher corner frequency. For decreasing flow, a HP filter corner lower in frequency than the current filter corner is selected when the present timer value exceeds a switchdown value corresponding to such lower filter characteristic. The adaptive response makes the invention useful for instruments responsive to the square of the fluid velocity, such as vortex flowmeters or which must respond to a large dynamic input range of frequencies. Finally, output means convert the signal from the filter means into a transmitter output, typically a 4–20 mA current or a frequency output, which is representative of such physical parameter.

The filter means may also include low pass (LP) filter means having a variable low frequency corner which is set as a function of the diameter of a pipe through which the fluid flows and the density of the fluid. Furthermore, there is Schmitt trigger means receiving the filtered signal and coupled between the timer means and the adaptive response means for providing a stable filtered signal to the adaptive response means. In an automated LP corner setting mode, the adaptive response means decreases the frequency of the LP filter corner frequency until a first corner frequency is encountered where the output of the Schmitt trigger is no longer a square wave, and then increases such first corner frequency to a second corner frequency greater than the first corner frequency.

DETAILED DESCRIPTION OF THE PREFERRED EMBODIMENTS

Figure 1:
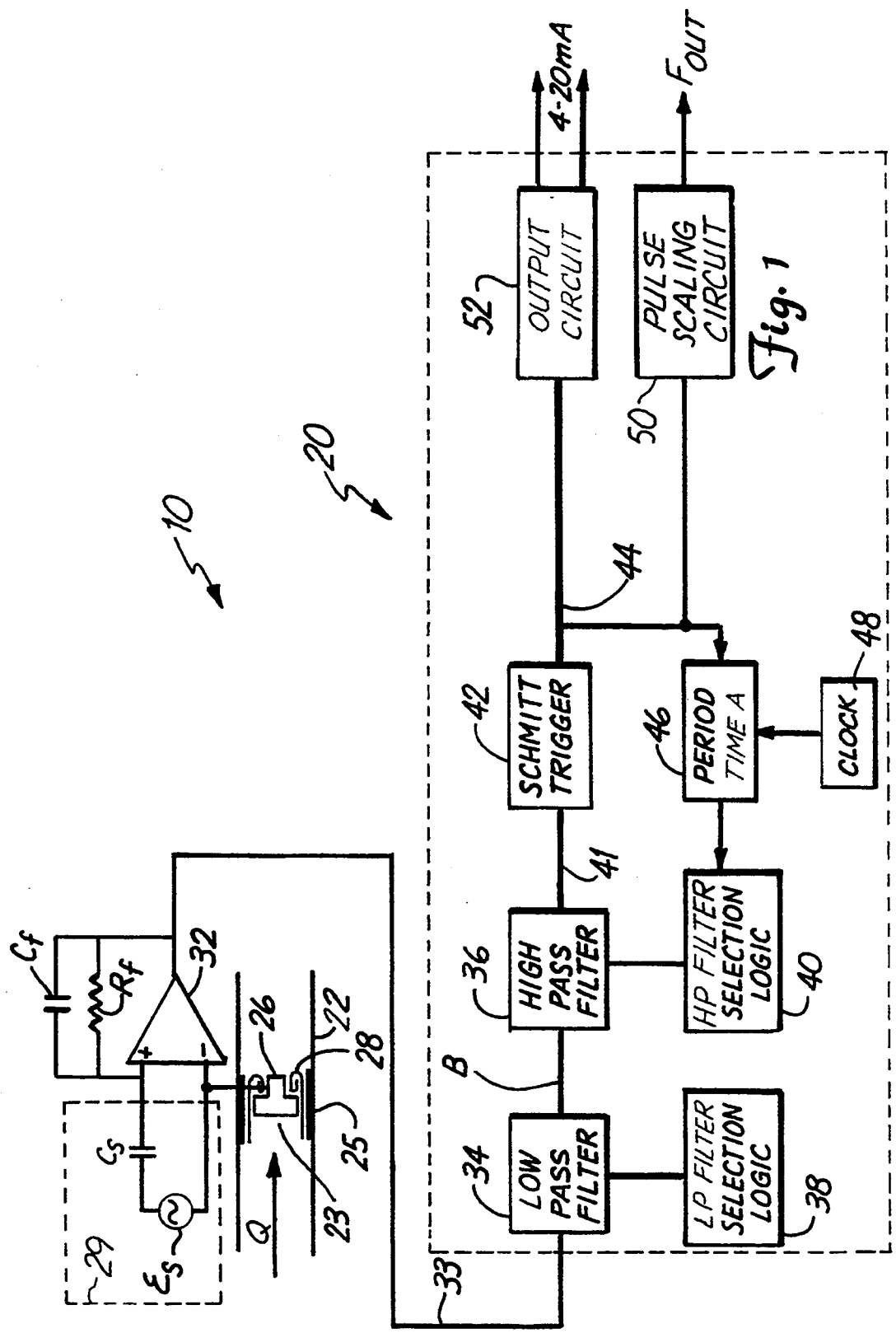
FIG. 1 is a block diagram of a vortex flowmeter in accordance with the present invention.

FIG. 1 shows a vortex flowmeter 10 including electronics generally indicated at 20 for conditioning a vortex sensor signal 33. Electronics 20 increases the signal-to-noise ratio of signal 33 and produces both a 4–20 mA current representative of flow and a square wave output $F_{out}$ having a frequency proportional to the frequency of signal 33.

Electronics 20 are applicable to field mounted process control instruments which must respond to a wide dynamic range of input frequencies. Electronics 20 are particularly appropriate for meters sensing a physical parameter responsive to a power of the variable which the output represents. For example, both vortex flowmeters and swirlmeters measure fluid flow by sensing an amplitude modulated pressure signal whose frequency is proportional to the flow and output a signal representative of the flow rate.

A liquid or gas fluid 23 creates a flow, Q, through a pipe 22. A vortex meter housing 25 having a bluff body 26 therein is located in pipe 22. When fluid 23 flows past body 26, shedding vortices 28 having a frequency representative of the flow are produced. Bluff body 26, or subsections thereof, move in response to the pressure difference across bluff body due to the vortex shedding. Movement is sensed by, for example, a piezoelectric sensor shown at 29. Sensor 29 is modelled by a voltage source $E_S$ and a series capacitor $C_S$. The magnitude of the output signal from the piezoelectric sensor is proportional to the differential pressure, which is proportional to $\rho V^2$, where $\rho$ is the fluid density and V is the velocity of fluid 23, and also proportional to $\rho D^2 F^2$ (when the ratio of the size of the shedding bar to the pipe diameter is held constant), where D is the inside diameter of meter housing 25 and F is the shedding frequency.

Figure 2A:
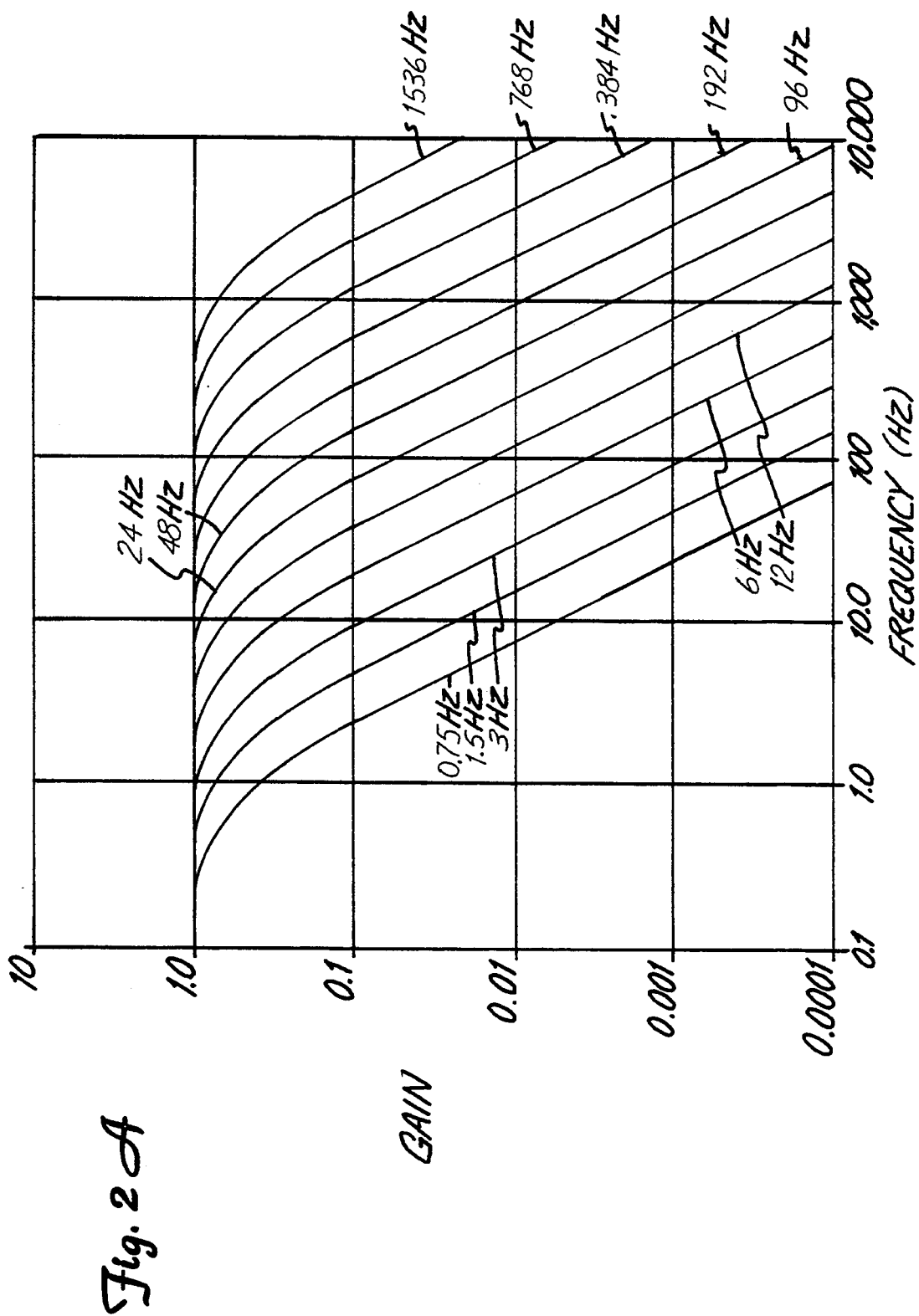
FIGS. 2A and 2B are graphs of the frequency responses of a two pole low pass filter and a four pole high pass filter having selectable frequency characteristics in accordance with the present invention.

The output of the piezoelectric sensor is coupled to a charge amp 32 which includes capacitor $C_F$ and resistor $R_F$ and outputs vortex sensor signal 33. Adjustable two-pole low pass (hereinafter LP) filter 34 conditions signal 33 to remove undesirable high frequency noise. The corner of LP filter 34 is set at or slightly below the lowest flow frequency expected in a specific application and therefore needs only to be set once per application. FIG. 2A shows the frequency responses for each of the preselectable LP filter 34 characteristics, specifically set in this embodiment of the invention for corner frequencies between 0.75 and 1536 Hz.

As the magnitude of vortex signal 33 changes substantially proportionally as the square of fluid 23 velocity and filter 34 has a $1/F^2$ response for frequencies above the filter's low frequency corner, the output of filter 34 is substantially constant, or flattened, at frequencies above the selected low frequency corner. This flattening phenomenon is desirable because it attenuates noise occurring at higher frequencies and at larger amplitudes more than it attenuates the vortex sensor signal 33 and provides a more consistent signal to noise ratio over a given flow range. As a result, LP filter 34 prevents the flowmeter from needlessly responding to noise at higher frequencies and at larger amplitudes than signal 33 because of the flattening phenomenon.

Figure 2B:
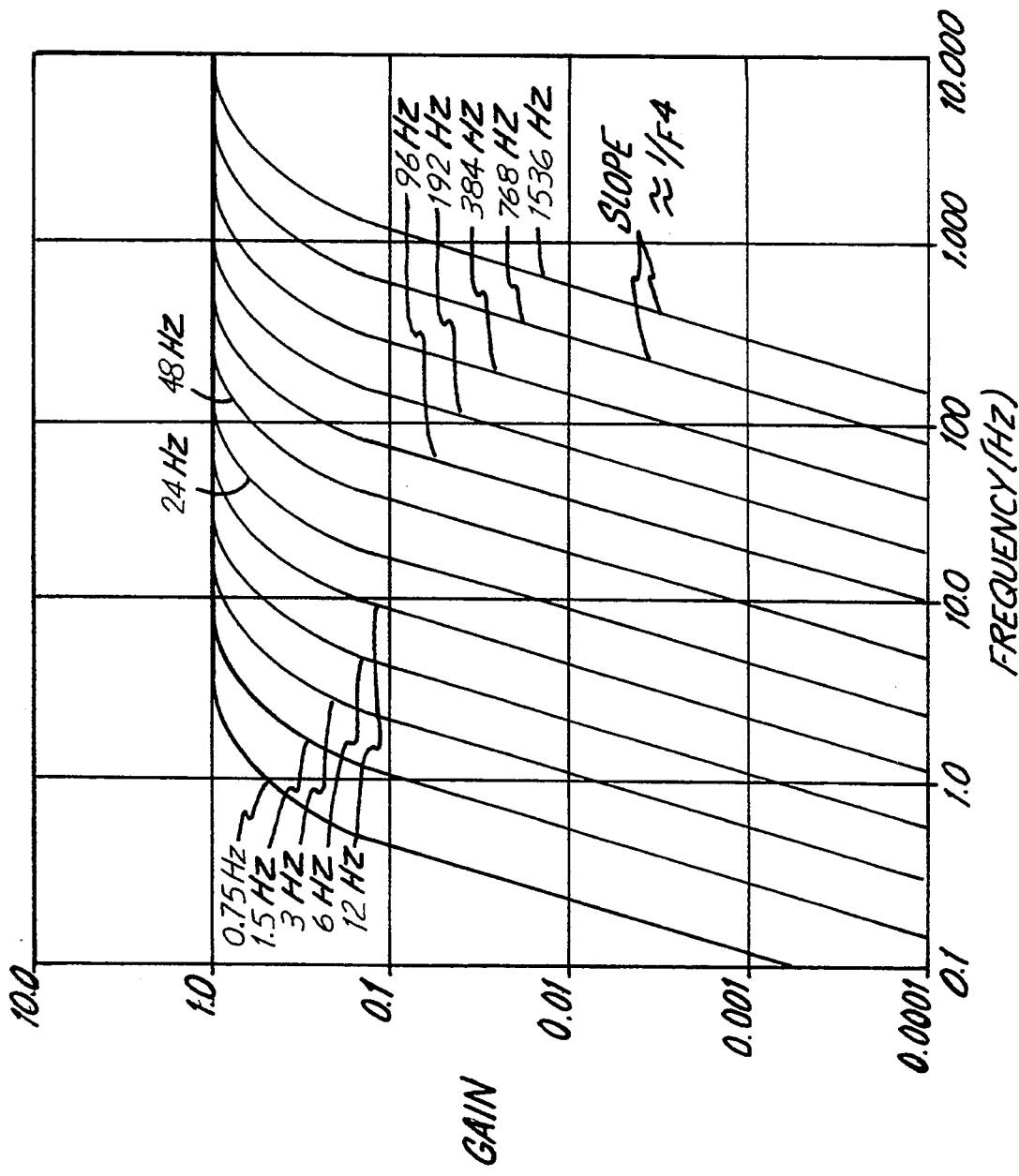

FIG. 2B shows the frequency response of four-pole high pass (hereinafter HP) filter 36 for each preselectable HP corner frequency. The family of LP and HP filter characteristics is chosen as appropriate for the maximum and minimum flows, the fluid density, and the meter size anticipated for use with electronics 20. Filter 36 attenuates the low frequency noise which LP filter 34 does not attenuate and produces signal 41. The frequency response of filter 36 has four poles because of the effective loss of two poles from filter 34 in the frequency range from the LP corner to the HP corner. The HP corner frequency is typically larger than the LP corner frequency in order to provide more noise immunity for low frequency noise. Without filter 36, this low frequency noise present at the output of HP filter 34 would be particularly troublesome at high flow rates when the low frequency noise has an amplitude greater than the amplitude of the vortex signal.

Schmitt trigger 42 squares the output of HP filter 36 to produce square wave signal 44, which has a frequency substantially equal to the frequency of vortex sensor signal 33. The voltage at which the output of trigger 42 changes state is preferably set to approximately twenty-five percent of the voltage level measured at signal 41. The measurement should be performed over the flattened section of the response found at frequencies above the low frequency corner of filter 34 in order to provide an optimally stable square wave output.

Period timer 46, clocked by clock 48, provides an elapsed time since a last period boundary of output signal 44 to HP filter selection logic 40. The elapsed time typically corresponds to the time since the last rising edge of signal 44, but alternatively may be made over more than one period to reduce the effect of jitter on HP filter selection. Jitter refers to the random variation in the main frequency component of the vortex signal 33. Averaging over several periods increases the response time to flow transients.

Figure 3:
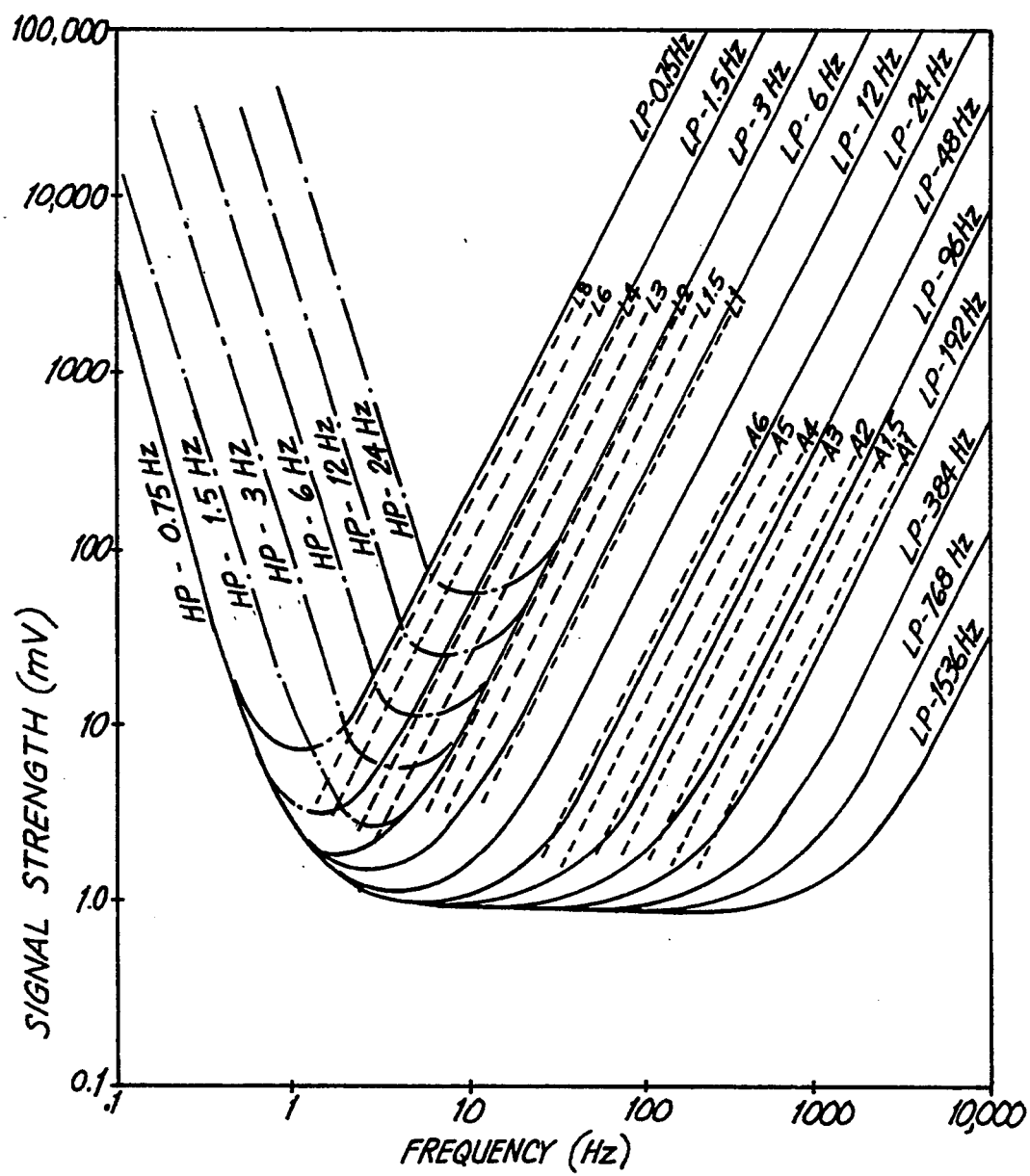
FIG. 3 is a graph of input signal level versus frequency for a bandpass filter, as if acting at the input of the filter and Schmitt trigger combination with two families of vortex meter flow curves superimposed thereon.

FIG. 3 shows the set of preselectable LP filter attenuation characteristics (in solid lines) between 0.75 Hz and 1536 Hz. The family of HP filter attenuation characteristics (in dotted/dashed line) is provided only for the 3 Hz LP characteristic. For this example, the 3 Hz LP characteristic corresponds to LP filter 34 and one of the characteristics of the HP family corresponds to HP filter 36. The envelope formed by the 3 Hz LP characteristic and whichever HP characteristic is selected defines the area where signal 41 has an amplitude large enough to exceed the voltage threshold necessary to make the output of trigger 42 change state. Superimposed on these filter characteristics are the flow curves for two families of pipes. Curves L1–L8 are for pipes carrying liquids of density 62.4 lb/ft$^3$ at atmospheric pressure and ranging in diameter between one and eight inches. Flow curves A1–A6 are for a family of pipes carrying air at atmospheric pressure and ranging in diameter between one and six inches. Increasing fluid density moves the curves vertically upward for the same velocity range and increasing diameter moves the curves to the left for the same velocity range. As the magnitude of the output signal of vortex signal 33 is proportional to $\rho D^2 F^2$. Each application will typically have a different flow curve. Increasing flows are represented as successively higher operating points on the same flow curve. Once the flow curve for the instant application is substantially known, the proper LP filter characteristic can be selected.

There must be enough of an amplitude margin between the flow curve and the LP characteristic to provide for stable operation of Schmitt trigger 42. A margin of 4:1 between the amplitude of signal 41 to the voltage required to trigger Schmitt trigger 42 is preferred to allow for small amplitude modulations and for filter switching transients.

Figure 4:
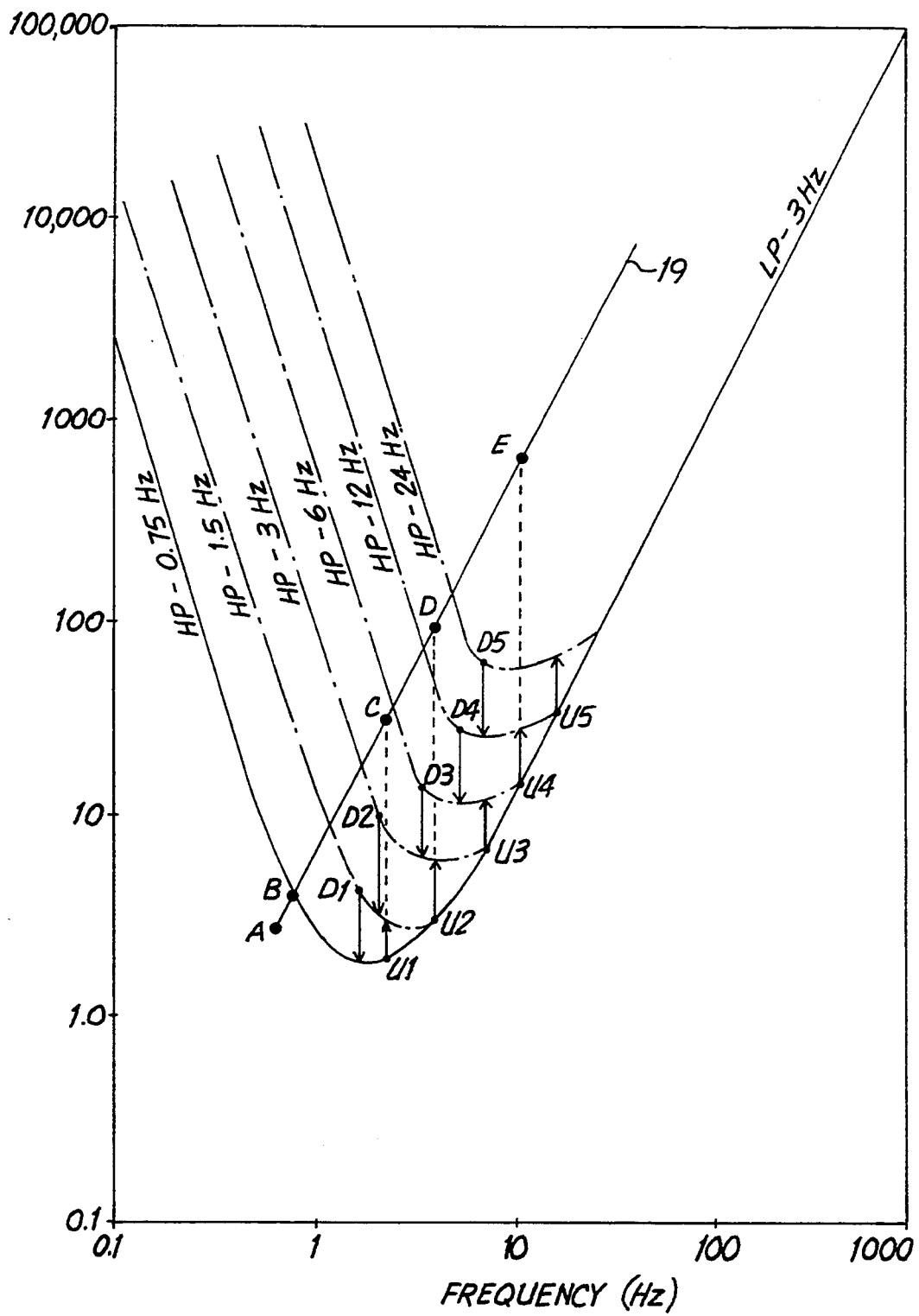
FIG. 4 is a graph of input signal level versus frequency for a combined bandpass filter, having the 3 Hz LP characteristic selected, as if acting at the input of the filter and the Schmitt trigger, with a single flowmeter curve superimposed thereon

FIG. 4 shows a single LP filter characteristic (a 3 Hz filter characteristic) and a family of HP filter characteristics (0.75 Hz, 1.5 Hz, 3.0 Hz, etc.). Superimposed on these filter characteristics is an operating curve for a pipe of eight inch diameter carrying liquid of density 62.4 lbs/ft$^3$, indicated at reference designator 19. Points A, B, C, D and E represent different operating points on curve 19. Point A has the lowest flow of the five points and points B, C, D and E have successively faster flow rates. As discussed above, the envelope formed by the 3 Hz LP characteristic and whichever HP characteristic is selected defines the area where signal 41 has an amplitude large enough to exceed the voltage threshold necessary to make the output of Schmitt trigger 42 change state. For example, consider application of signal 33 to the combination of filter 34,36 and trigger 42 when the 0.75 LP characteristic is selected for filter 34. If signal 33 were of the amplitude and frequency represented at point A on curve 19, signal 44 would be a constant voltage, whereas application of signal 33 represented at point C on curve 19 would result in a square wave signal at signal 44.

HP filter selection logic 40 recognizes two switchpoints corresponding to each of the preselected HP filter characteristics (a "switchup point" and a "switchdown point") and recognizes which HP filter characteristic is currently used in HP filter 36, (the "current filter characteristic"). Each switchpoint represents a timer value representative of a frequency at which logic 40 should select a new filter characteristic. Logic 40 continually monitors the value of period timer 46, (the "present timer value"). The switchup and switchdown point for each preselectable filter characteristic introduce hysteresis, which minimizes excessive filter switching caused by frequency jitter in vortex signal 33.

When the flow increases from a no-flow condition in pipe 22, signal 44 becomes a square wave at point B. HP filter characteristic 0.75 Hz is set by default. Period timer 46 is reset by a period boundary of signal 44 and consequently represents the elapsed time since the last period boundary of signal 44. When the present timer value at the end of a signal 44 period, (the "period timer value"), is less than a switchup point corresponding to the HP filter characteristic having the next highest frequency corner, logic 40 immediately selects the filter with such next higher frequency corner for use in filter 36. For example, when the flow has increased to point C, the period timer value at the end of a signal 44 period is less than the switchup point corresponding to the 1.5 Hz HP filter characteristic shown at U1 and logic 40 will immediately select the 1.5 Hz characteristic. When flow increases to point D, the period timer value at the end of a signal 44 period is less than the switchup point corresponding to the 3.0 Hz HP filter characteristic shown at U2 and logic 40 immediately selects the 3.0 Hz characteristic. As the flow increases to point E on curve 19, the 6.0 Hz HP filter characteristic is chosen using the same selection process. The response time of electronics 20 when successively higher frequency corner HP filters are selected decreases as the flow increases. In summary, logic 40 selects the filter characteristic having the next higher corner frequency relative to the corner frequency of the current filter characteristic when the period timer value, as sampled when signal 44 changes state, is less than the switchup point for such next higher corner frequency filter.

This selection process selects a filter having a corner one step away in frequency from the corner of the current filter characteristic. An alternative selection process can be configured to select a filter characteristic more than one step away in corner frequency than the current filter characteristic. In such a selection process, logic 40 compares the period timer value at the end of a period of signal 44 to the set of switchup points and selects the filter characteristic having a corner corresponding to the higher of the switchup points which bound the period timer value.

A different selection process is used for decreasing flows. Logic 40 compares the present timer value and the switchdown point assigned to the HP filter characteristic having the next lower frequency corner than the current filter characteristic. When the flow decreases and the point on curve 19 moves from point E through point D towards point C, the 6 Hz HP characteristic continues to be used as the filter characteristic of filter 36 until the present timer value exceeds the switchdown value assigned to point D3, at which time logic 40 selects for immediate use in filter 36 the 3 Hz HP characteristic. This same process continues as the flow decreases and the present timer values exceed successively larger switchdown values assigned to switchdown points D2 and D1, respectively, without receiving a period boundary to initiate selection. In summary, for a decreasing flow, logic 40 selects the filter characteristic having the next lower corner frequency relative to the corner frequency of the current filter characteristic when the present timer value exceeds a switchpoint corresponding to the filter characteristic having such next lower corner frequency. In other words, the corner frequency of HP filter 36 is adjusted in response to the frequency of signal 44 and selection logic 40 sets the filter corner frequency adequately below the frequency of signal 44. This method of selecting filter characteristics continues without resetting timer 46 until signal 44 changes state or until the filter characteristic having the lowest possible corner is activated, in which case timer 46 is stopped to avoid overflow. The next period boundary restarts timer 46. A small timing error results from the delay to set the HP filter 36 before timer 46 is reset, which is compensated by resetting timer 46 to the delay time instead of setting it to zero or by providing a latch to hold the value of counter 46 and restarting the timer.

The hysteresis effected by this method of filter characteristic selection ensures that a currently selected filter characteristics is selected over a broad range of frequencies. For example, signal 44 frequencies corresponding to timer values between U5 and D4 are filtered by the 12 Hz HP characteristic. Similarly, signal 44 frequencies corresponding to timer values between D2 and U3 are filtered by the 3 Hz characteristic. This feature ensures that frequency jitter of vortex signal 33 will cause minimal filter switching and therefore reduce undesirable noise.

Although the above discussed filter corners are selected to be separated in frequency by a factor of two, alternate arrangements are acceptable. A family of HP filters having corner frequencies separated by factors of the fourth root of two is preferred since it provides less sensitivity to noise and is convenient for a digital implementation of the filtering function.

The adaptive filter response disclosed above is considered open loop since changing the filter corner frequency has no affect on the period measurement which controls the filter. Adaptive response time allows one set of electronics 20 to be used for all meter sizes and flow ranges, even though the dynamic range of a vortex flowmeter varies from 1 Hz for 8″ diameter meters carrying liquid to 6000 Hz for ½″ diameter meters carrying gases.

Alternate vortex signal conditioning methods have disadvantages. Automatic gain control methods modify filter characteristics based on the amplitude of a vortex sensor output and consequently can track noise instead of the flow signal. Those methods utilizing a HP tracking filter experience a loss of pulses during fast reductions in flow rate. In such electronics, a decreasing flow transient causes the HP filter to attenuate the flow signal because the time required for the tracking filter to change to a new filter selection was longer than the flow transient. The time constant is necessarily set by the lowest flow frequency and is therefore too large at high flow frequencies. This caused a loss of pulses, and consequently of flow rate output during such a transient. If, on the other hand, the HP filter corner was far from the vortex flow frequencies to avoid attenuation during a decreasing flow transient, then the effectiveness of the filter was reduced. The present invention avoids these transient problems due to both its unique self-adapting response time and the method by which HP filter characteristics are selected in the absence of a period boundary of signal 44, since the response time of the electronics decreases as the frequency of vortex signal 33 increases. This means that the electronics respond faster at high flow rates than they do at low flow rates.

The user initiated LP filter selection logic 38 selects a corner frequency for LP filter 34 as a function of the diameter of pipe 22 and the density of fluid 23. This selection is typically performed once during an application and needs to be changed, for example, when a meter size is changed or when fluid density is substantially changed. The corner can be selected via a handheld communicator over a current loop, operator set manual dip switches, or an automated process which allows flowmeter 10 to select its proper setting and provide maximum noise immunity. For an automated setting, a flow rate is set in pipe 22 is which is approximately half the maximum flow rate for flowmeter 10. The operator then initiates the flowmeter's automatic LP filter selection process. Flowmeter 10 lowers the corner of LP filter 34 until the signal 44 is no longer a square wave. The corner frequency of LP filter 34 is then increased by a factor of approximately two to provide a factor of four between trigger 42 output and the voltage required for Schmitt trigger 42 to change state. A factor of approximately two is chosen because of the $1/F^2$ response on filter 34, which provides a factor of four change in amplitude. With proper communications electronics, selection and adjustment of the LP filters can be automatically achieved with an initiation command from an operator over a two wire current loop, after a stable midrange flow with an adequate signal to noise ratio has been established.

Pulse scaling circuit 50 converts square wave signal 44 into $F_{out}$, which is representative of flow rate corresponding to a convenient unit of measure such as pulses per gallon. Circuit 50 is preferably digital in order to guarantee accuracy, provide a wide range of multiplication factors and space the output pulses evenly. Output circuit 52 converts square wave signal 44 into a 4–20 mA current representative of the flow. Circuit 52 is coupled to a current loop commonly used in the process control industry. Some flowmeters have an alternate embodiment of output circuit 52 which outputs digital information, representative of flowmeter status parameters and flow, superimposed on the 4–20 mA current line or power line.

Figure 5:
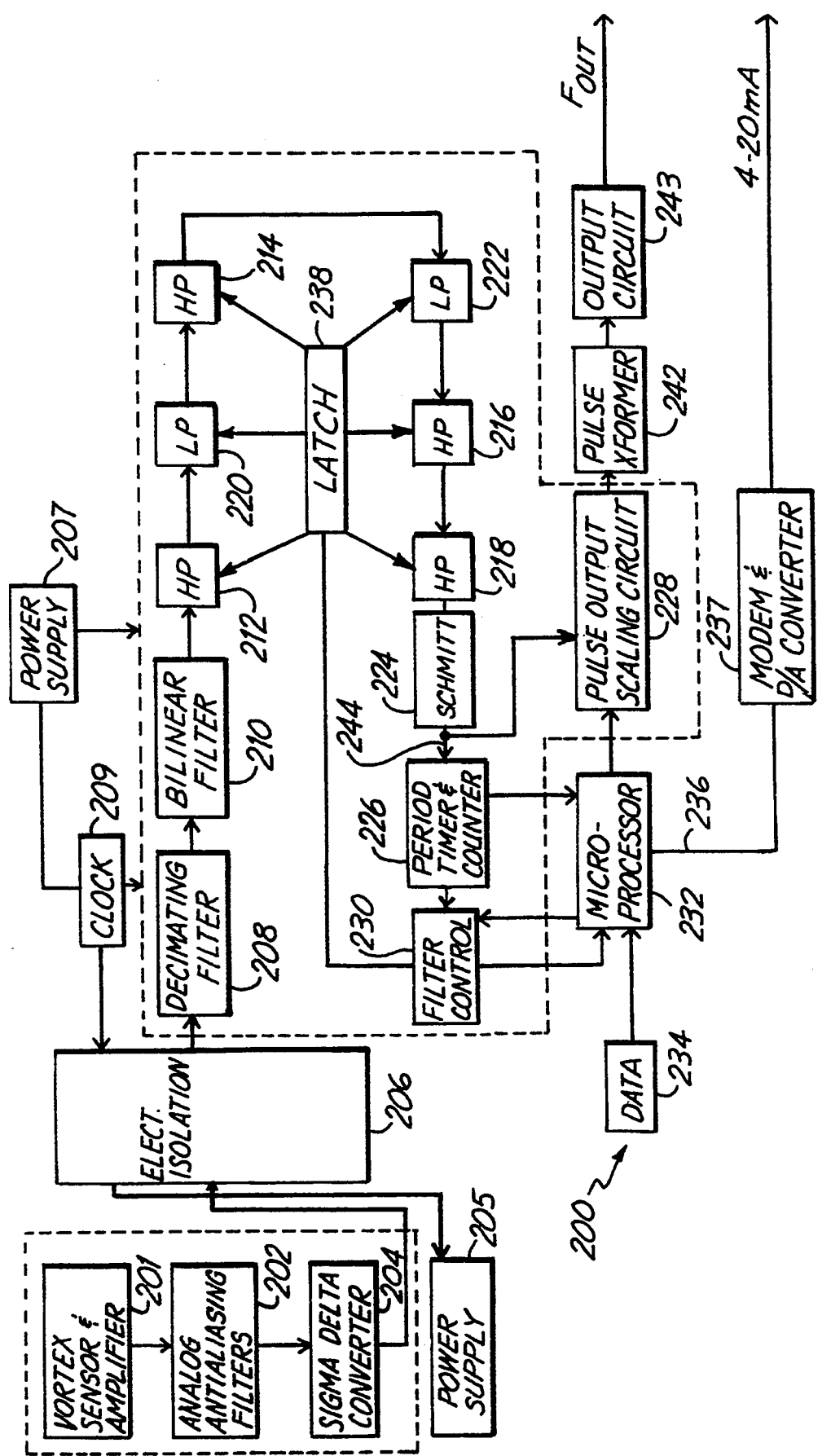
FIG. 5 is a block diagram of an alternate embodiment of vortex flowmeter in accordance with the present invention.

A digital embodiment of the present invention utilizing digital filters is indicated generally at 200 in FIG. 5. A digital implementation of the function described for flowmeter 200 is preferred because it is more powerful and flexible than analog filtering and can be under direct software control of a microprocessor in a smart transmitter. An analog anti-aliasing filter 202 receives the analog signal from a vortex flow sensor and amplifier 201. Filter 202 filters the sensor signal to remove unwanted high-frequency noise and performs anti-aliasing filtering.

Sigma-delta converter 204 samples the vortex signal at approximately 307.2 kHz and outputs a single bit datastream at 307.2 kHz which is representative of the amplitude and frequency of the output of vortex sensor and amplifier 201. There are no word boundaries in the datastream. The relative number of ones and zero, sometimes called the bit density, is representative of the amplitude of the vortex signal. Converter 204, which is preferably implemented in a CMOS ASIC to minimize power, cost and size, is particularly suited to digitizing AC signals in the one to ten kHz range which is a typical frequency range for vortex flow sensors. A sigma-delta converter simplifies electronics since circuits which synchronize the transmission of a data words or circuits which count the number of bits in a word are not needed. Preferably the output datastream has a frequency approximately 100 times greater than the typical maximum vortex frequency, which is between 1–6 kHz. Oversampling means moves quantization noise to higher frequencies. Subsequent digital filtering and decimation simplifies the anti-aliasing requirements and maintains the quantization noise inherent in sigma-delta converters at higher frequencies than the maximum vortex frequency. The sampling rate is chosen to be as low as possible to reduce power yet still have low noise amplitude in the vortex frequency band. This serial high-frequency format is ideal for transmission across an electrical isolation barrier 206 required for sensors which are grounded or have resistive leakage to ground due to high temperature loss of insulation resistance. Such sensors are typically used in vortex flowmeters to reduce cost and simplify connections. Furthermore, the single bit datastream enables an inexpensive, compact transformer or capacitor to be used in isolator 206. Other isolation media are acceptable such as optical, piezoelectric/acoustic and magnetostrictive isolation means.

Two signals are transmitted across isolation 206. A power supply 207 supplies power to a clock 209 whose output signal is passed through isolation 206 and from there to power supply 205, which squares the clock signal and provides as a clock to circuits 201-204. The clock signal is also rectified and voltage regulated to operate as a power source for circuits 201-204. This arrangement also synchronizes clocks on both sides of barrier 206. Secondly, the serial bitstream from converter 204 is passed through isolation 206 in the other direction to a digital decimating filter 208. Isolator 206 isolates the grounded vortex sensor from the 4-20 mA current loop of the flowmeter to avoid noise and currents in ground loops. Decimating filter 208 increases the width of the data word from one bit wide to ten bits wide and reduces the sampling frequency by a factor of ten to 30.72 kHz. Filter 208 reduces the amplitude of quantization noise and prevent aliasing of higher frequency signals caused by the decimation. The decimation factor is chosen so the decimation sampling rate is five to eight times greater than the highest frequency of the vortex signal in order to use simple digital filters in subsequent stages. Output of decimating filter 208 is received by a LP infinite impulse response filter (IIR) 210 that was designed by a bilinear transformation from the analog to digital domain, using coefficients of $\frac{1}{2}$ and $\frac{1}{4}$ to allow register shifting to replace multiplying circuits. IIR filter 210 has a zero at one half the 30.72 kHz sampling frequency and a 3,259 Hz corner frequency chosen to be at the upper end of a typical frequency output for a one inch flowmeter. Thus, filter 210 does not attenuate the flow signal, but minimizes unwanted high frequency quantization noise present in the sigma delta converter. The decimating and bilinear filters are not required when other methods of analog to digital conversion are used.

Infinite impulse filter (IIR) 212 receives the output of IIR filter 210. Filters 212-222 are serially connected in the following order: filter 212, filter 220, filter 214, filter 222, filter 216, and then filter 218. Each filter is a digital representation of a single pole low pass filter or a single pole high pass filter. An analog implementation of the circuit would also use two LP filters and four HP filters each having a single pole. HP and LP filters 212-222 are ordered in this fashion to reduce transients caused when HP filter characteristics are switched by microprocessor 232, since HP filter transients have high frequency components which are not attenuated by succeeding HP filters. Otherwise, the digital equivalent of Schmitt trigger 224 may produce extra output pulses. By interleaving the HP and LP filters as indicated, this transient effect is attenuated sufficiently to substantially eliminate the effect. Schmitt trigger 224 receives the output of filter 218 which generates a square wave vortex signal 244 having substantially the same frequency as the frequency of the output of vortex sensor and amplifier 201. Timer and period counter 226 outputs the elapsed time since a last period boundary of signal 244 to filter control 230, and the time between period boundaries of signal 244. The function of counter 226 with respect to the elapsed time is equivalent to the function of timer 46 in FIG. 1.

Logic 230 operates similarly to HP selection logic 40. Logic 230 receives switchup and switchdown values corresponding to each of the preselectable HP filter characteristics from microprocessor 232 and recognizes which HP filter characteristic is currently used in each of the HP filters 212,214,216,218, (the "current filter characteristic"). As discussed above in conjunction with FIG. 3, there is a switchup and a switchdown value associated with each HP filter characteristic. Logic 230 also continually monitors the value from period timer and counter 226, (the "present timer value"). For an increasing flow, logic 230 sends an interrupt to microprocessor 232 when the filter characteristic having the next higher corner frequency relative to the corner frequency of the current filter characteristic when the present timer value, as sampled at a period boundary of signal 244, is less than the switchup point for such next higher corner frequency filter. For a decreasing flow, logic 230 interrupts micro 232 when the filter characteristic having the next lower corner frequency relative to the corner frequency of the current filter characteristic when the present timer value exceeds a switchdown value corresponding to the filter characteristic having such next lower corner frequency. The adaptive filter response of filters 212-218 is open loop since changing the filter corner frequency has no affect on the period measurement which controls the filter.

It is preferable for each filter to have a single variable pole, so that the corner frequency of the combined filter output has finer frequency resolution than if a single x-pole filter corner frequency were chosen. For example, four single HP filters each having independently variable corners have a combined corner frequency characteristic which changes as the fourth root of two, whereas a single four pole filter would have a corner characteristic variable in factors of two. Use of shift registers to perform multiplication is another simplifying design choice which reduces power consumption and the number of digital gates needed for each filter. As the digital filter output is the sum of first order terms each consisting of the product of a coefficient and a variable, when the coefficients multiplying the variables are chosen to be factors of one-half, only shift registers are required where a full multiplier circuit would otherwise be needed. For this reason, corner frequencies are only adjustable in factors of two. It is also preferable to implement the filters and associated circuitry placed within dashed box 250 into an ASIC to conserve power and for ease of assembly.

Microprocessor 232 calculates appropriate corner frequencies for filters 212-222 and sends corner selection commands representative of the proper HP filter characteristic to filter control 230 and to filter selection latch 238. Latch circuit 238 distributes filter selection values to filters 212-222. Microprocessor 232 also performs supervisory functions, optional output conditioning and required communications between the flowmeter and a process control system which receives the flowmeter output. An example of a supervisory function is disabling filter tracking, whereas examples of output conditioning are setting damping and alarm limits, and low flow cutoff, depending on user preference data contained in application data block 234.

Signal 244 operates timer and a period counter 226 which interrupts microprocessor 232 with data representative of the frequency of signal 244. The interruption occurs approximately every tenth of a second or once each period of signal 244, whichever represents the longer amount of time. After interruption, microprocessor 232 calculates an updated vortex frequency and provides such output digitally on output 236. Converter and modem 237 converts the digital information encoded on output 236 to a 4-20 mA current representative of the flow. Other output formats, such as Fieldbus or other process control industry standard communications formats can be used as appropriate. Microprocessor 232 also provides a signal to pulse output scaling circuit 228 which provides the necessary signals to operate a pulse transformer 242. Pulse transformer 242 provides an electrically isolated signal to output circuit 243. Circuit 243 provides a frequency output $F_{out}$ representative of the flow.

What is claimed is:

1. A transmitter sensing a physical parameter and transmitting an output representative of such physical parameter, comprising:

filter means for filtering a noise contaminated signal having a fundamental frequency varying responsively to the physical parameter, the filter means filtering the noise with a current HP filter characteristic to produce a filtered signal having a frequency representative of the physical parameter, the HP filter characteristic selected from a family of preselectable HP filters, each filter having varying corner frequencies and a switchup and a switchdown value corresponding thereto;

timer means for providing a period timer value representative of the time between period boundaries of the filtered signal and for providing a present timer value representative of the elapsed time since a last period boundary of the filtered signal;

adaptive response means for selecting a current HP filter for use in the filter means, such that a HP filter corner higher in frequency than the current filter corner is selected when the period timer value is less than a switchup value corresponding to the filter having such next higher corner frequency and a HP filter corner lower in frequency than the current filter corner is selected when the present timer value exceeds a switchdown value corresponding to such lower filter characteristic; and output means for converting the filtered signal into the transmitter output.

2. The transmitter of claim 1 where the switchup and switchdown values are substantially the same value.

3. The transmitter of claim 1 where the output means convert the filtered signal into a frequency output having a frequency substantially proportional to the fundamental frequency.

4. The transmitter of claim 1 where the output means convert the filtered signal into a current having a magnitude substantially proportional to the fundamental frequency.

5. The transmitter of claim 1 where the output means convert the filtered signal into an optical signal having a magnitude substantially proportional to the physical parameter.

6. The transmitter of claim 1 wherein the filter means includes a selected LP filter means from a family of LP filters.

7. The transmitter of claim 6 where the physical parameter is flow and the LP frequency corner is set as a function of the diameter of a pipe through which a fluid flows, and the density of the fluid.

8. The transmitter of claim 6 where the LP filter means is digital.

9. The transmitter of claim 1 further comprising Schmitt trigger means receiving the filtered signal and coupled between the timer means and the adaptive response means for providing a stable filtered signal to the adaptive response means.

10. The transmitter of claim 9 where the filter means includes LP filter means for selecting a LP filter characteristic from a family of LP filters characteristics, each having a low frequency corner, such that in an automated LP corner setting mode, the LP filter means decreases the frequency of the LP filter corner frequency until a first corner frequency is encountered where the output of the Schmitt trigger is no longer a square wave, and then increases such first corner frequency to a second corner frequency greater than the first corner frequency.

11. The transmitter of claim 10 where the second corner frequency differs from the first corner frequency by a factor of substantially two or more.

12. The transmitter of claim 9 where the stable filtered signal changes state when the filtered signal is approximately twenty-five percent of a maximum voltage level of the filtered signal.

13. The transmitter of claim 1 where the period timer value and the present timer value are averaged over more than one period of the filtered signal.

14. The transmitter of claim 1 where the filter means is digital.

15. The transmitter of claim 1 where the filter means comprises more than one cascaded HP filter, each having a single pole.

16. The transmitter of claim 15 where the corner frequency of the cascaded filters are separated in frequency by a factor of substantially two.

17. The transmitter of claim 15 where the filter means includes four cascaded one pole filters and two single pole LP filters arranged in the order: HP, LP, HP, LP, HP and HP.

18. The transmitter of claim 1 where the family of HP filters have frequency corners separated by factors of fourth root of two in frequency.

19. The transmitter of claim 1 where the HP filter characteristic is provided by cascaded HP filters each having a single pole, and where the adaptive response means switch no more than one single pole filter at a time so as to minimize the difference in frequency between two successively selected corners.

20. The transmitter of claim 1 further comprising sigma delta analog-to-digital converter means for converting the noise contaminated input signal to a digital signal represented by a serial one-bit signal provided to the filter means.

21. The transmitter of claim 20 further comprising isolation means coupled between the sigma-delta converter means and the filter means for providing electrical isolation therebetween, where the isolation means receives the serial bitstream and transmits it to the filter means and a power supply signal from the filter means is transmitted through the isolation means to the converter means for providing power therefor.

22. The transmitter of claim 21 where the power supply signal acts as a clock for the filter means and for the sigma delta converter means.

23. A flowmeter receiving a noise contaminated input signal having a fundamental frequency varying responsively to a flow and providing an output representative of the flow, comprising:
  filter means receiving the input signal for providing a filtered signal, the filter means having a variable LP and HP frequency corner, the HP filter corner set so that when the fundamental frequency decreases the HP corner is lowered, and when the fundamental frequency increases the HP corner is raised;
  timer means for measuring a time between period boundaries of the filtered signal and measuring an elapsed time since a last period boundary of the filtered signal; and
  adaptive control means for controlling the HP corner frequency such that a HP filter corner higher in frequency than the current filter corner is selected when the period of the filtered signal is less than the period corresponding to a higher frequency filter characteristic and a HP filter corner lower in frequency than the current filter corner is selected when the elapsed time since a last filtered signal boundary exceeds the period corresponding to a lower frequency filter characteristic.

24. The flowmeter of claim 23 where the period value which switches the HP filter corner to a higher frequency corner is substantially different than the elapsed time which switches the HP filter corner to a lower frequency corner, so as to reduce sensitivity of filter switching to small variations in fundamental frequency.

25. A method for reducing noise to signal ratio of a noise contaminated input signal which has a fundamental frequency varying responsively to a physical parameter and providing a signal with a frequency proportionally representative of the input signal fundamental frequency, the method comprising:
  measuring the output frequency to obtain a measured output frequency value by measuring time between period boundaries of the signal;
  measuring an elapsed time since an occurrence of a last period boundary in the signal; and
  controlling a HP filter characteristic as a function of the measured output frequency value such that the HP filter characteristic is raised when the period of the signal is less than the period corresponding to a higher frequency characteristic and the HP filter characteristic is lowered when the elapsed time since a last period boundary of the signal exceeds the period corresponding to a lower frequency filter characteristic.

26. The method as disclosed in claim 25 further comprising controlling a LP filter frequency characteristic as a function of an application specific parameter related to the physical parameter.

27. A transmitter sensing a physical parameter and transmitting an output representative of such physical parameter, comprising:
  conversion means for sensing the physical parameter and converting the sensed physical parameter into a one-bit datastream having a bit density representative of the physical parameter; and
  output means for conditioning the datastream to provide the transmitter output, the output means including isolation means for electrically isolating the one-bit signal from the output means.

28. The transmitter of claim 27 where the conversion means is a sigma-delta converter.

29. A two-wire process control transmitter, comprising:
  sensing means for sensing a physical parameter and providing a noisy analog output having a fundamental frequency varying responsively to the physical parameter;
  digitizing means for generating a digital signal representative of the analog output;
  digital processing means for real-time filtering the digital signal to identify a fundamental frequency, where the filter characteristics change as a function the frequency of the fundamental frequency, the digital processing means providing an output indicating the fundamental frequency; and
  output means receiving the digitally processed output for providing a transmitter output representative of the physical parameter.

30. The transmitter of claim 29 wherein the digital processing means includes HP filter means for filtering the digital signal with a HP filter characteristic to produce a filter signal having a frequency representative of the physical parameter, the HP filter characteristic selected from a family of preselectable HP filters, each filter having varying corner frequencies and a switchup and a switchdown value corresponding thereto.

31. The transmitter of claim 30 further comprising timer means for providing a period timer value representative of the time between period boundaries of the filtered signal and for providing a present timer value representative of the elapsed time since a last period boundary of the filtered signal.

32. The transmitter of claim 31 further comprising adaptive response means for selecting a current HP filter for use in the digital processing means, such that a HP filter corner higher in frequency than a current filter corner is selected when the period timer value is less than a switchup value corresponding to the filter having such next higher corner frequency and a HP filter corner lower in frequency than the current filter corner is selected when the present timer value exceeds a switchdown value corresponding to such lower filter characteristic.

* * * * *

UNITED STATES PATENT AND TRADEMARK OFFICE
CERTIFICATE OF CORRECTION

PATENT NO. : 5,372,046
DATED : December 13, 1994
INVENTOR(S) : Lowell Kleven and Roger Frick It is certified that error appears in the above-indentified patent and that said Letters Patent is hereby corrected as shown below:

Under [57] ABSTRACT, line 12 please change "element select" to --element selects--.

Col. 14, line 26, after "function" insert --of--.

Signed and Sealed this

Thirteenth Day of February, 1996

*Attest:*

BRUCE LEHMAN

*Attesting Officer*          *Commissioner of Patents and Trademarks*